July 2, 1940.  C. W. DIECKMANN  2,206,529
CUTTER FOR MEAT GRINDERS
Filed Dec. 4, 1937
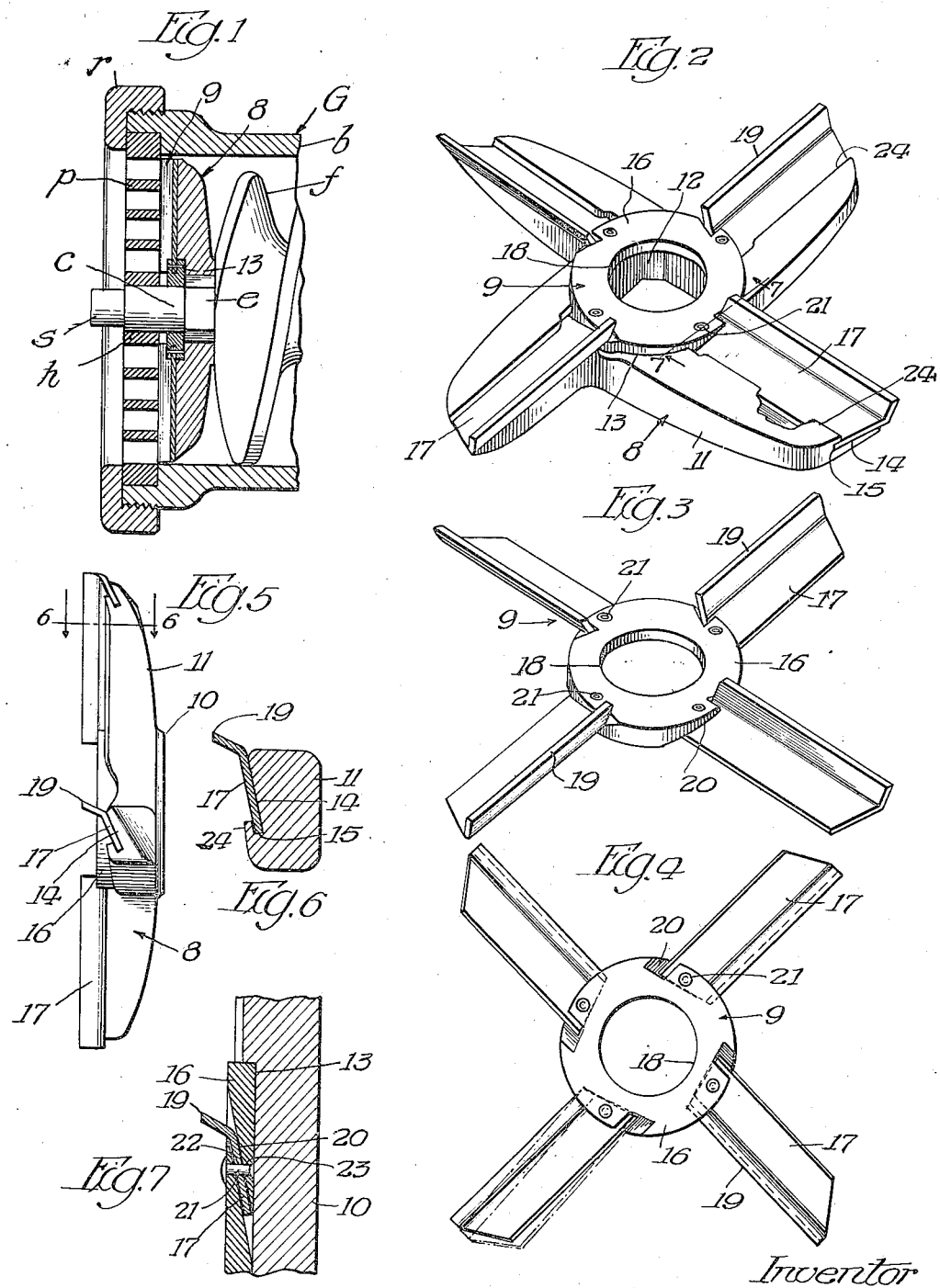
Inventor
Charles W. Dieckmann
By Fred Gerlach
his Atty.

Patented July 2, 1940

2,206,529

UNITED STATES PATENT OFFICE 2,206,529

CUTTER FOR MEAT GRINDERS

Charles W. Dieckmann, Chicago, Ill.

Application December 4, 1937, Serial No. 178,046

4 Claims. (Cl. 146—189)

The present invention relates generally to cutters for meat grinders. More particularly the invention relates to that type of meat grinder cutter which is adapted to fit against the inner face of a circular perforated plate at the discharge end of the casing of the grinder and to be driven conjointly with a feed screw by a centrally disposed shaft in the casing and comprises (1) a cast metal spider consisting of a hub and a plurality of arms extending substantially radially from the hub and embodying at their rear faces longitudinal grooves extending inwardly from the leading edges of the arms to the central portions of the arms and from the outer extremities of the arms to the hub and having flat bottom faces and straight full length shoulders along their rear portions; and (2) a detachable knife consisting of a hub fitting against the rear face of the spider hub and a plurality of blades extending substantially radially from the knife hub and having the leading margins thereof bent rearwards and ground to form cutting surfaces and their trailing margins fitting flatly in the grooves in the arms of the spider and in addition abutting against the shoulders in order to form driving connections whereby during operation of the cutter driving pressure is applied to the blades and the knife is caused to rotate conjointly with the spider.

In the manufacture of a cutter of this type it has heretofore been customary to form the blades of the detachable knife separately from the knife hub and to connect the blades in place by fitting and welding the inner ends thereof in cut-outs in the outer periphery of the knife hub. In practice it has been found that although a cutter of this general character fulfills its intended purpose it is not especially durable or practical because it is practically impossible to weld the blades to the knife hub so that the trailing edges thereof all seat against their respective shoulders at the rear portions of the grooves in the arms of the spider and hence during use of the cutter strain develops at the welds or junctures of the non-seating blades and the knife hub and fractures often result.

The primary object of the present invention is to provide a meat grinder cutter which is an improvement upon, and is more practical and durable than, previously designed cutters of the type under consideration by reason of the fact that the blades instead of being welded to the knife hub are pivotally connected to such hub in such manner that they are free to swing to a limited extent in the plane of the knife and hence automatically seat themselves against their respective shoulders in response to working pressure thereagainst and effect or cause full length contact between their trailing edges and the shoulders throughout the entire length thereof.

A further object of the invention is to provide a meat grinder cutter which is generally of new and improved construction and has certain advantages over that which forms the subject matter of, and is claimed in, an application for United States Letters Patent filed by me September 11, 1937, Serial No. 163,349.

Other objects of the invention and the various advantages and characteristics of the present meat grinder cutter will be apparent from a consideration of the following detailed description.

The invention consists in the several novel features which are hereinafter set forth and are more particularly defined by claims at the conclusion hereof.

In the drawing which accompanies and forms a part of this specification or disclosure and in which like numerals of reference denote corresponding parts throughout the several views:

Figure 1 is a vertical longitudinal sectional view of the discharge end of a meat grinder having applied thereto a cutter embodying the invention;

Figure 2 is a perspective of the improved cutter showing the knife and spider in connected or assembled relation;

Figure 3 is a rear perspective view of the detachable knife of the cutter, illustrating in detail the arrangement and design of the separately formed blades;

Figure 4 is a front elevational view of the knife showing the manner in which the blades are pivotally connected to the knife hub for limited swinging movement in the plane of the knife;

Figure 5 is a side view of the cutter;

Figure 6 is an enlarged transverse sectional view taken on the line 6—6 of Figure 5 and illustrating the manner in which the trailing margins of the blades fit flatly in the grooves in the arms of the spider and the trailing edges of the blades abut against the shoulders at the rear portions of the grooves; and Figure 7 is an enlarged sectional view taken on the line 7—7 of Figure 2 and showing the construction and design of the pivotal connections between the inner ends of the blades and the knife hub.

The cutter which is shown in the drawing constitutes the preferred embodiment of the invention. It comprises as the parts thereof a spider 8 and a knife 9 and is adapted for use in connection with a meat grinder G. The latter is of conventional or standard design and comprises a horizontally extending tubular body b and a feed screw f. The body b embodies at the inlet end thereof a hopper (not shown) and has a perforated plate p at its discharge end. The plate, as shown in Figure 1, fits within an annular groove in the discharge end of the body and is secured in place by means of a clamp ring r. The feed screw extends longitudinally through the body b and is adapted during drive or rotation thereof to feed the meat to be ground from the hopper to and through the perforated plate p. It corresponds in diameter to the internal diameter of the body and is supported at its discharge end by means of a shaft s which extends through a bearing forming hole h in the central portion of the perforated plate and has on the portion thereof between the plate and the discharge end of the screw a polygonal enlargement e, and an enlarged cylindrical part c. The cutter is disposed between the discharge end of the feed screw and the perforated plate and is adapted for conjoint drive with the screw and to cut or grind the meat as the latter is fed by the screw to and through the plate p.

The spider 8 is formed of a one piece metallic casting and consists of a hub 10 and a plurality of arms 11. The hub 10 has a polygonal hole 12 which extends through the central portion thereof and corresponds in shape to the polygonal enlargement e on the shaft s and is adapted to receive said enlargement, as shown in Figure 1, and form a driving connection between the shaft and the spider. In addition to the polygonal hole 12 the hub 10 of the spider has a circular seat 13. This seat is formed in the rear face of the hub 10 and is larger in size than the hole. The arms 11 of the spider are preferably four in number and extend substantially radially from the hub 10. They are arranged at right angles to one another and have longitudinally extending grooves 14 in the rear faces thereof. These grooves extend from what may be termed the leading edges of the arms to the central portions of the arms and run or extend from the outer extremities of the arms to the circular seat 13. The faces of the spider arms which define the bottom portions of the grooves are flat and extend at an angle of approximately 25° with respect to the plane of the rear face of the hub 10. The faces of the arms which define the inner side portions of the grooves extend at right angles to the faces which define the groove bottom portions, and form or constitute longitudinally extending shoulders 15. The latter extend from the outer extremities of the arms to the seat 13. The front faces of the arms 11 of the spider are curved or rounded so that the meat is readily deflected to the sides of the arms when the cutter is in use in the grinder G.

The knife 9 is designed and adapted to fit against the rear face of the spider 11 of the cutter and consists of a hub 16 and a plurality of blades 17. The hub is ring-shaped and has a hole 18 in the central portion thereof. This hole corresponds in diameter to, and is adapted to receive, the enlarged cylindrical part c of the shaft s, as shown in Figure 1. The hub 16 is shaped to fit within the circular seat 13 in the hub 10 of the spider and coacts with said seat to hold the knife against side or edgewise displacement with respect to the spider when it is in its operative position, that is, in connected or assembled relation with the spider. The blades 17 correspond in number to the arms 11 and radiate, and are formed separately, from the hub 16. They are arranged at right angles to one another and are formed of steel or like hard metal and in such manner that the grain of the metal extends longitudinally thereof. The rear or trailing margins of the blades are adapted to fit flatly within the grooves 14 in the arms 11 of the spider and are flat on both faces thereof, as shown in Figures 6 and 7. They are shaped conformably to the grooves 14 and are disposed at an angle of approximately 25° with respect to the plane of the rear face of the ring shaped hub 16. The rear edges of the trailing margins of the blades 17 are straight and are adapted to fit flatly against the shoulders 15 when the knife is in its operative position with respect to the spider. The shoulders 15 are the same in length as the edges of the trailing margins of the blades 17 so that the blades are subjected during operation of the cutter to driving pressure throughout the entire length thereof. The front or leading margins of the blades are bent rearwardly at an angle of approximately 120° with respect to the trailing margins and are ground at the edges thereof to form cutting surfaces 19. The inner ends of the trailing margins of the blades 17 project inwards beyond the inner ends of the leading margins and fit within straight angularly disposed slots 20 in the outer marginal portion of the ring-shaped hub 16. These slots, as shown in Figure 7, extend at an angle of approximately 25° with respect to the rear face of the hub and have flat sides. Pivot pins 21 extend through holes 22 in the inner ends of the trailing margins of the blades and also pairs of holes 23 in the slotted outer marginal portion of the hub and serve pivotally to connect the blades of the knife to the hub. The ends of the pins are riveted or beaded over so as to prevent axial displacement of the pins with respect to the blades and the hub 16. The pins extend at right angles to the rear face of the last mentioned hub, as shown in the drawing. The slots 20 project through and intersect the front and rear faces of the hub 16 and their width or thickness is slightly greater than the thickness of the blades with the result that the blades are free to swing to a limited extent in the plane of the knife 9. As a result of this swinging movement the blades are free so that in response to working pressure thereagainst they seat themselves properly with respect to their respective shoulders 15. By employing pivotal connections at the inner ends of the blades as contradistinguished from fixed or welded connections the blades are always fully backed by the shoulders and are not subject to strain at the inner ends thereof tending to rupture or fracture their connection with the hub 16. The inner ends of the leading margins of the blades project through the portions of the slots 20 which intersect the rear face of the knife hub 16, as shown in Figure 3.

In order releasably and securely to hold the knife in connected or assembled relation with the spider the arms 11 are provided with integral longitudinally extending lips 24. These lips overhang the outer rear portions of the grooves 14, as shown in Figures 4, 6 and 7 and are adapted frictionally to grip the outer portions of the rear or trailing margins of the blades 17. The inner faces of the lips 24 are spaced from the walls of the spider arms 11 which define the bottom portions of the grooves 14 a distance substantially corresponding to the thickness of the blades with the result that the trailing margins of the blades are frictionally gripped when the knife is in place with the rear edges of the blades in abutting relation with the shoulders 15. The lips extend inwards from the outer ends of the arms 11 of the spider and terminate adjacent to the central portions of said arm. In assembling the cutter, that is, in connecting the knife to the spider, the knife is first arranged so that the ring-shaped hub 16 thereof is in centered relation with the circular seat 13 in the hub of the spider and the blades 17 are opposite the grooves 14 in the arms 11 and in spaced relation with the lips 24, as shown in Figure 3. Thereafter the blades are pressed towards the spider arms 11 and the knife is rotated relatively to the spider in order to bring the rear or trailing margins of the blades into seated relation with the grooves and abutment with the shoulders 15. The blades are urged or pressed inwards in order to bring the trailing margins thereof beneath the lips 24. Because of the arrangement and design of the lips the knife moves into its operative position with a snap action and is frictionally and effectively held in place by the lips as soon as the trailing edges are swung or shifted therewith. As soon as the knife is brought into operative or connected relation with the spider the blades may be individually swung in the direction of the shoulders 15 in order to bring the trailing edges thereof into abutment with such shoulders. If the blades are not brought into abutment or seated relation with the shoulders during assembly of the knife with respect to the spider the blades automatically seat themselves against the shoulders when they encounter operating pressure during use in the grinder. As heretofore pointed out, the automatic seating is attributable to the pivotal connections between the inner ends of the blades and the outer marginal portion of the ring-shaped hub 16 of the knife.

The herein described cutter may be manufactured at a comparatively low and reasonable cost and is extremely durable inasmuch as the pivotal connections between the inner ends of the blades and the knife hub permit the blades so to seat themselves that they are engaged throughout their length by the shoulders 15 and are not subject to fracture at their points of juncture with the hub 16.

The invention is not to be understood as restricted to the details set forth, since these may be modified within the scope of the appended claims, without departing from the spirit and scope of the invention.

Having thus described the invention, what I claim as new and desire to secure by Letters Patent is:

1. A cutter for a meat grinder, comprising a spider consisting of a hub provided with mounting means therefor and a plurality of arms extending substantially radially from the hub and embodying in the rear faces thereof longitudinal grooves extending from the outer extremities of the arms to said hub and having flat bottom faces and straight shoulders along their rear portions, and a unitary detachable knife consisting of a hub positioned adjacent to the rear face of the spider hub and a plurality of separately formed substantially radially extending blades corresponding in number to and associated respectively with the spider arms and having the leading margins thereof shaped to present cutting surfaces and their trailing margins fitting flatly in the grooves in the spider arms and abutting against said shoulders and also having their inner ends movably connected to the knife hub so that they are free to move to a limited extent in the plane of the knife and in response to pressure thereagainst to adjust themselves into true abutting relation with the shoulders.

2. A cutter for a meat grinder, comprising a spider consisting of a hub provided with mounting means therefor and a plurality of arms extending substantially radially from the hub and embodying in the rear faces thereof longitudinal grooves extending inwardly from the leading edges of the arms to the central portions of said arms and from the outer extremities of the arms to the hub and having flat bottom faces and straight substantially full length shoulders along their rear portions, and a unitary detachable knife consisting of a hub positioned adjacent to the rear face of the spider hub and a plurality of separately formed substantially radially extending blades corresponding in number to and associated respectively with the spider arms and having the leading margins thereof shaped to present cutting surfaces and their trailing margins fitting flatly in the grooves in the spider arms and abutting against said shoulders and also having their inner ends pivotally connected to the knife hub so that they are free to swing to a limited extent in the plane of the knife and in response to pressure thereagainst to adjust themselves into full length abutting relation with the shoulders.

3. A cutter for a meat grinder, comprising a spider consisting of a hub provided with mounting means therefor and a plurality of arms extending substantially radially from the hub and embodying in the rear faces thereof longitudinal grooves extending inwardly from the leading edges of the arms to the central portions of the arms and from the outer extremities of the arms to the hub and having flat bottom faces extending at an acute angle with respect to the plane of the rear face of the hub and also having straight full length shoulders along their rear portions, and a unitary detachable knife consisting of a hub positioned adjacent to the rear face of the spider hub and provided with angular slots in the outer marginal portion thereof, a plurality of substantially radially extending blades corresponding in number to and associated respectively with the spider arms and having the leading margins thereof extending rearwards to present cutting surfaces and their trailing margins extending angularly with respect to the knife hub and fitting flatly in the grooves in the spider arms and abutting against said shoulders and also having the inner ends of said trailing margins extending into the slots in the knife hub, and pivot pins extending through the slotted outer marginal portion of the knife hub and said inner ends of the trailing margins of the blades and forming pivotal connections whereby said blades are permitted to swing to a limited extent in the plane of the knife and in response to pressure thereagainst to adjust themselves into full length abutting relation with the shoulders.

4. A cutter for a meat grinder, comprising a spider consisting of a hub having a polygonal hole therethrough for mounting purposes and a circular seat around said hole at its rear face and a plurality of arms extending substantially radially from the hub and embodying in their rear faces longitudinal grooves extending inwardly from the leading edges of the arms to the central portions of the arms and from the outer extremities of the arms to the seat and having flat bottom faces extending at an acute angle with respect to the plane of the rear face of the hub and also having straight full length shoulders along their rear portions, a detachable knife consisting of a ring-shaped hub fitting in the circular seat in said rear face of the spider hub and provided with angular slots in its outer marginal portion thereof intersecting both side faces thereof, a plurality of substantially radially extending blades corresponding in number to and associated respectively with the spider arms having the leading margins thereof extending rearwards to present cutting surfaces and their trailing margins fitting flatly in the grooves of the spider arms and abutting against said shoulders and also having the inner ends of said trailing margins extending into said slots and connected pivotally to the slotted outer marginal portion of the knife hub so that the blades are free to swing to a limited extent in the plane of the knife and in response to pressure thereagainst to adjust themselves into full length abutting relation with the shoulders, and means for releasably securing the knife in assembled relation with the spider comprising elongated lips formed integrally with said arms and arranged so that they overhang and extend lengthwise of the shoulders and engage releasably and frictionally the rear faces of the trailing margins of the knife blades.

CHARLES W. DIECKMANN.